Patented July 28, 1953

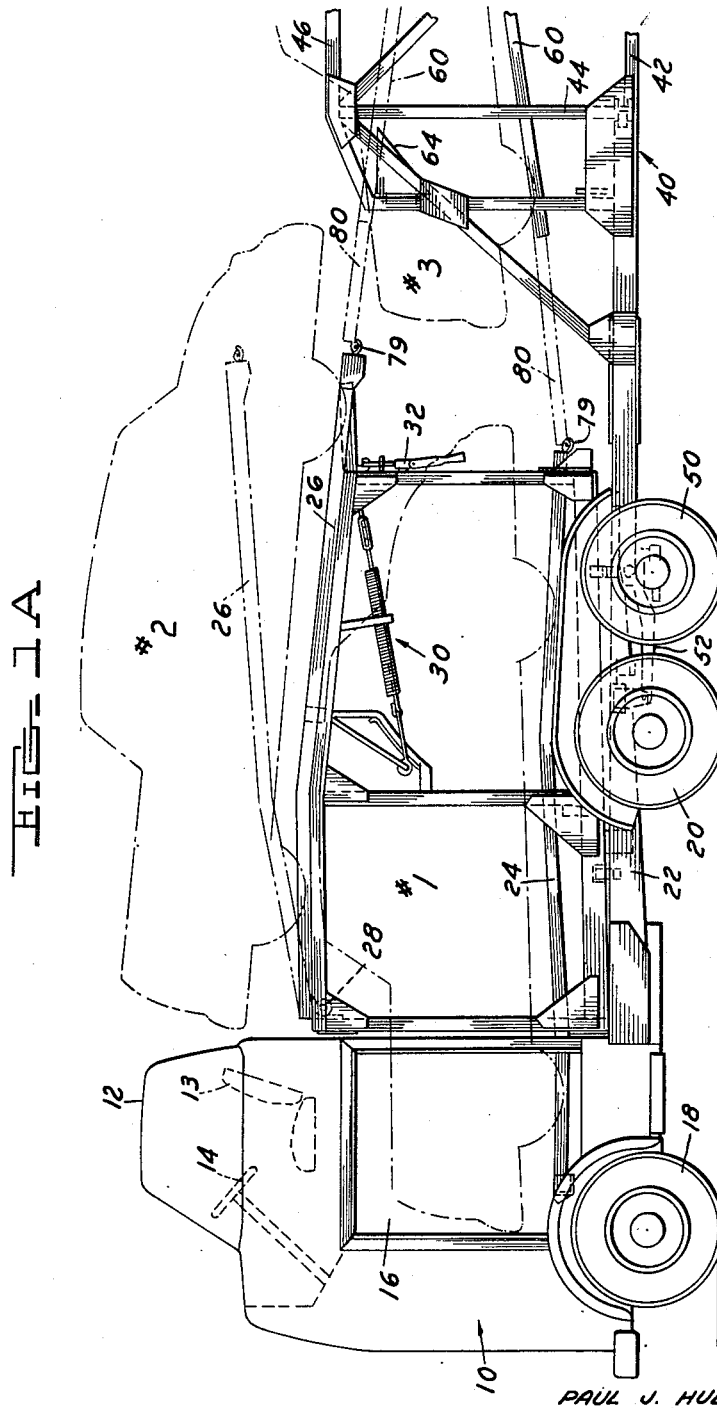

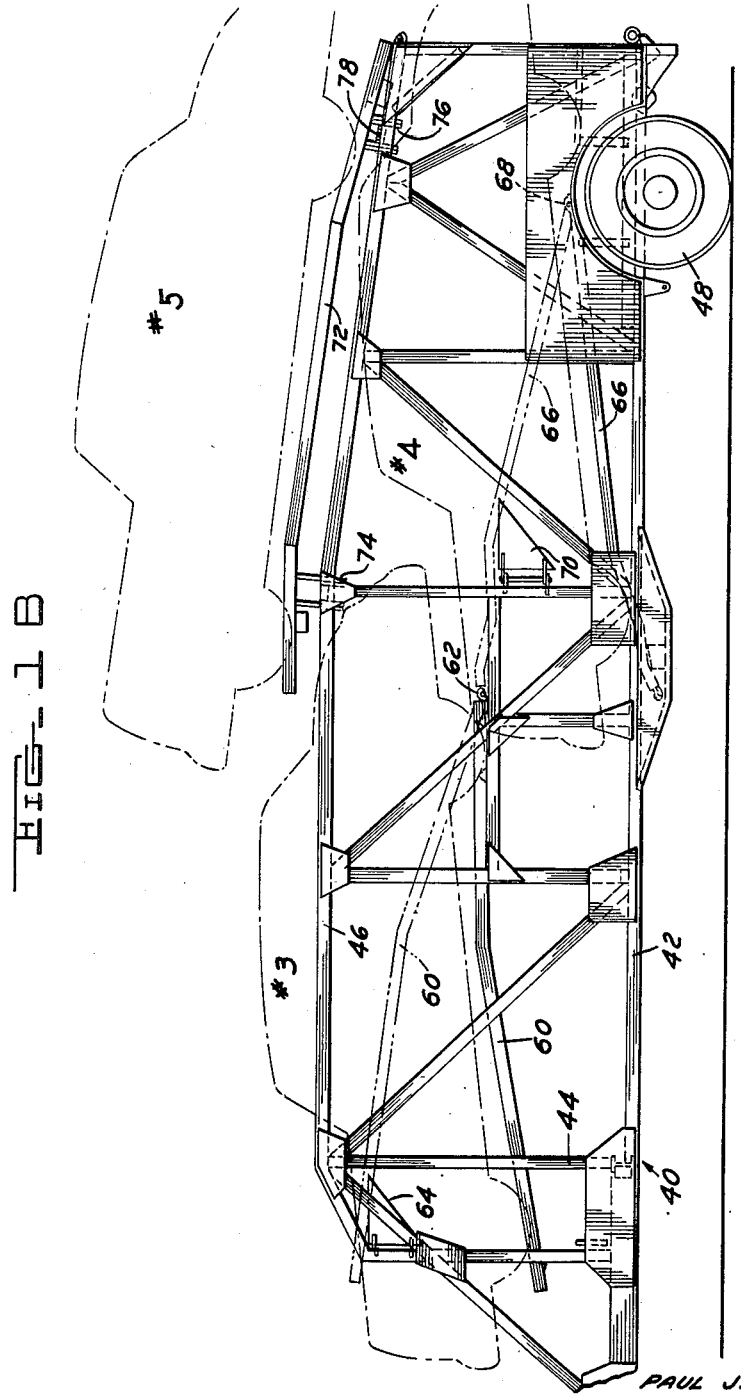

2,647,010

UNITED STATES PATENT OFFICE 2,647,010

METHOD OF LOADING MOTOR TRANSPORTS

Paul J. Huebshman, Dearborn, Mich., assignor to Whitehead & Kales Company, River Rouge, Mich., a corporation of Michigan Application January 16, 1950, Serial No. 138,913

4 Claims. (Cl. 296—1)

The present invention relates to a method of loading motor transports.

At the present time four-car transports are in common use but no completely satisfactory five-car transports are available. One of the reasons for the lack of five-car transports, despite the fact that such transports would obviously increase efficiency and reduce the expense of car hauling operations, are limitations imposed by various States as to overall length, height and structural arrangements of car transports.

According to the present invention five cars are disposed on a motor transport in such a manner as to meet all of the various requirements set up in the different States and at the same time the cars are disposed in a manner which renders loading and unloading of the transport a simple and easy operation. Furthermore, the position of all of the cars in transport is such that the cars need not be drained or given any special servicing prior to or following transport by motor vehicle.

It is accordingly an object of the present invention to provide a method of loading automobiles on a motor transport in a manner characterized by the ease with which the cars are loaded and unloaded and the fact that all of the cars in transit are carried in a position which does not requiring draining or special services.

More specifically, it is an object of the present invention to provide a method of loading transports which comprises placing two forward cars in vertically spaced relation, an intermediate car with its forward end beneath the rear end of the upper forward car, and two rear cars in vertically spaced relation with the forward ends thereof respectively over and under the rear end of the intermediate car.

It is a further object of the present invention to provide a method of loading cars for motor transport which comprises positioning an intermediate car between vertically spaced forward and rear cars, with the rear end of the intermediate car slightly elevated and disposed intermediate the front ends of the rear cars.

It is a further object of the present invention to provide a method of loading five cars for motor transport in which all of the cars in transit are carried in substantially horizontal position and in no case at an angle which substantially exceeds about ten degrees.

Other objects and features of the invention will become apparent as the description proceeds, especially when taken in conjunction with the accompanying drawings, wherein:

Figures 1A and 1B together comprise a single side elevation of a loaded motor transport, loaded in accordance with the method disclosed herein.

Referring now to the figures the particular motor transport chosen for purposes of illustration comprises a truck 10 having an elevated cab 12 in which is located a driver's seat 13 and the driving controls including the steering wheel 14. The truck is designed to provide a cargo space indicated generally at 16, beneath the cab. The truck includes front wheels 18 and rear drive wheels 20 and a main frame 22. Carried by the frame 22 is a car supporting structure which includes a pair of fixed tracks 24 which extend into the cargo space 16 beneath the cab 12. In addition, the truck comprises a pair of elevated car supporting tracks 26 which are pivoted to the super structure as indicated at 28 and are provided with counterbalance mechanism indicated generally at 30 for retaining the tracks 26 in the elevated position indicated in dotted lines in Figure 1A. The tracks 26 in the lowermost position are locked down by a toggle type lock indicated generally at 32.

The truck is adapted to be associated with a trailer indicated generally at 40. The trailer comprises a frame made up of sill elements 42, vertical posts 44, and upper rails 46. At its rear end the trailer is provided with ground wheels 48 and at its forward end it is provided with a second pair of ground wheels 50. Thus the trailer is a full trailer as contrasted with a semi-trailer. Means are provided for interconnecting the front of the trailer to the frame of the truck and this means is indicated generally at 52.

The trailer comprises a pair of hinged track sections 60 which are pivoted as indicated at 62. The pair of track sections are movable between the full line and the dotted line positions indicated in Figure 1B. In the elevated position indicated in dotted lines, the track sections 60 are supported on swinging brackets 64.

In addition, the trailer is provided with a second pair of track sections 66 pivoted to the frame as indicated at 68, and movable between the full line and dotted line positions indicated in Figure 1B. Again, the track sections 66 are supported in elevated position by hinged supporting brackets 70.

At the top rear of the trailer are provided a third pair of track sections 72. These track sections are carried by the frame of the trailer for swinging movement about generally longitudinally extending axes and for this purpose hinges indicated at 74 and 76 are provided. Preferably, the track sections 72 are counterbalanced by springs indicated at 78.

In addition to the foregoing described track units, the transport is provided with short track sections 80 which interconnect the track 60 to either of the tracks 24 and 26, and for this purpose is connected to the rear of either of tracks 24 or 26 as indicated at 79.

The method of loading the transport will now be described. The track 60 is moved to lowermost position and is connected by the track section 80 to the track 24. The track 66 is positioned in elevated position to connect with the rear end of the track section 60. Suitable skids are provided for permitting a vehicle to be driven up onto the rear end of the trailer. Tracks 72 are swung upward to give clearance for loading cars #1, #2, #3 and #4. Thereafter, the first car which is herein designated as #1, is driven over the skid, the track 66, the track 60, and track 80 onto the track 24. At this time the track 26 is retained in its elevated position so as to clear the top of car #1. Car #1 is secured in position on the track 24 and it will be observed that its forward end is disposed substantially beneath the cab 12.

After the car #1 has been placed in position track 26 is lowered into the location shown in full lines in Figure 1A and track 60 is moved to the elevated position indicated in dotted lines in Figure 1A. The tracks 60 and 26 are interconnected by track section 80. The second car, herein designated as car #2, is then driven onto the rear of the trailer over the tracks 66, 60 and 80, and onto the track 26. It is carried on this track and is secured in position with its forward end directly in rear of the cab 12.

The track section 60 is next lowered to the full line position illustrated in Figure 1B and car #3 is now driven over the skid and track 66 onto the track 60. It will be observed that the track 60 includes a downwardly and forwardly inclined front portion which is designed to dispose the low forward end of car #3 substantially below the overhanging rear end of car #2. At the same time car #3 is carried in a position which does not depart substantially from horizontal. In the specific embodiment illustrated car #3 is disposed at an angle of about ten degrees. This is a very important consideration since if cars are carried at relatively large angles from the horizontal in transit it is necessary to drain the oil from the cars and to provide other special servicing either prior to or after transit, or both, to prevent injury to the car. This is a particularly troublesome operation since it is desirable to drive the cars onto and off of the motor transport under their own power. If the cars have been drained or given other special services for transit, serious and permanent injury to the vehicle may result. In accordance with the present invention however, all of the cars are disposed sufficiently close to horizontal so as to avoid the necessity for special servicing.

After car #3 has been moved into position track 66 is moved to the lowermost position indicated in full lines in Figure 1B and car #4 is driven onto the trailer and onto track 66. Due to the downward and forward inclination of track 66, the forward low end of car # 4 will be positioned substantially beneath the slightly elevated rear end of car #3.

To complete the loading the laterally swingable tracks 72 are now swung downward to car carrying position and an elevated loading ramp is connected to the rear ends of these tracks. Thereafter car #5 is moved into position onto the track 72, in which position the forward end of car #5 substantially overlies the low rear end of car #3.

From the silhouette of the cars on the transport it will be observed that both the front and rear ends of the cars are relatively low and that intermediate the front and rear ends there is an elevated enclosed body section. While all of the cars have been illustrated as carried on the motor transport with their front ends forwardly, it will be evident that if desired the cars could be located on the transport in reverse, that is with their rear ends forwardly. Alternatively, some of the cars may be positioned with their front ends forwardly and others of the cars may be positioned with their rear ends forwardly.

While in the foregoing description of the method of loading the transport, specific reference has been made to driving all of the vehicles onto the transport from the rear end of the trailer, it will be apparent that this sequence is not required. Thus for example, the trailer 40 could be jackknifed to expose the rear end of the truck and cars #1 and #2 could be driven directly onto tracks 24 and 26 from suitable ramps.

While it is ordinary practice to drive automobiles onto the motor transport under their own power, it will be understood that this is not an essential element of the method and the cars may be moved into position by any suitable method such for example, the cars may be moved over the tracks in the sequence described by means of winches or the like.

In the event that the cars are driven onto the transport under their own power it will be appreciated from the foregoing that certain of the cars may be driven forwardly over the tracks or they may be driven in reverse over the tracks.

The drawings and the foregoing specification constitute a description of the improved method of loading motor transports in such full, clear, concise and exact terms as to enable any person skilled in the art to practice the invention, the scope of which is indicated by the appended claims.

What I claim as my invention is:

1. The method of nesting five cars each of which has a relatively low front and rear portion and an elevated central portion on a transport having an elevated cab with stowage space therebeneath which comprises placing two cars in superimposed forward position with the forward end of the lower car beneath the cab and the forward end of the upper car located rearwardly of the cab, placing an intermediate car with its forward end beneath the rear of the uppermost of the two forward cars and with the rear of the intermediate car elevated to dispose the intermediate car at a small forward and downward angle, and placing two rear cars in superimposed position with the forward ends of said cars overlapping the rear end of the intermediate car.

2. The method of loading a five-car transport consisting of a truck with loading space under the cab and a trailer with five cars, each of which has relatively low front and rear ends and a relatively elevated mid-portion, which comprises moving the first car onto the truck into a position with its forward end partially under the cab, moving the second car onto the truck into a position over the first car and immediately in rear of the cab, moving the third car onto the trailer to an intermediate position which is approximately level but in which the rear end is slightly elevated with the forward end of the third car beneath the rear end of the second car, moving the fourth car onto the trailer to a position such that the forward end thereof underlies the rear end of the third car, and moving the fifth car onto the trailer into a position generally above the fourth car and with the forward end of the fifth car overlying the rear end of the third car.

3. The method as defined in claim 1 which comprises placing the lower of the two cars in the forward position prior to placement of the upper of said two cars, thereafter placing the intermediate car in position, and finally placing the lowermost of the two rear cars in position prior to placement of the uppermost of said two rear cars.

4. The method as defined in claim 1 in which the forward inclination of the intermediate car is approximately 10 degrees.

PAUL J. HUEBSHMAN.

References Cited in the file of this patent

UNITED STATES PATENTS

| Number | Name | Date |
|---|---|---|
| 1,900,590 | Simning | Mar. 7, 1933 |
| 1,958,926 | Reid | May 15, 1934 |
| 1,965,525 | Roscher et al. | July 3, 1934 |
| 2,402,283 | Hewitt | June 18, 1946 |
| 2,452,270 | Stuart | Oct. 26, 1948 |

OTHER REFERENCES

"Oakland Motor Car Co. trailer" Illustration in "Autobody" magazine: page 21, July 1930.